United States Patent [19]
Bielfeldt et al.

[11] 3,804,381
[45] Apr. 16, 1974

[54] SCREW-TYPE INJECTOR FOR MOLDING MACHINE

[75] Inventors: Bernd Friedrich Bielfeldt, Aidenried; Richard Flohrs Richardsen, Seefeld, Oberalting, both of Germany

[73] Assignee: Krauss-Maffee Aktiengesellschaft, Munich-Allach, Germany

[22] Filed: Feb. 1, 1971

[21] Appl. No.: 111,442

[30] Foreign Application Priority Data
Feb. 4, 1970   Germany.......................... 2005095

[52] U.S. Cl.............. 259/191, 425/208, 425/812, 222/190, 425/192
[51] Int. Cl.............................................. B29f 1/02
[58] Field of Search ............ 425/73, 190, 192, 200, 425/202, 203, 204, 208, 242, 243, 251, 378, 379, 812; 259/4, 97, 191-193, 9, 10; 100/145, 146, 147, 148, 149, DIG. 62

[56] References Cited
UNITED STATES PATENTS

| | | | |
|---|---|---|---|
| 3,164,563 | 1/1965 | Maxwell et al. ............... | 425/243 X |
| 3,367,635 | 2/1968 | Gresch........................... | 425/203 X |
| 2,615,199 | 10/1952 | Fuller............................ | 425/103 X |
| 2,736,058 | 2/1956 | Dellheim........................ | 425/203 |
| 3,657,195 | 4/1972 | Doerfel et al.................. | 425/203 X |

FOREIGN PATENTS OR APPLICATIONS
1,103,897   2/1968   Great Britain .................... 425/203

Primary Examiner—J. Spencer Overholser
Assistant Examiner—David B. Smith
Attorney, Agent, or Firm—Karl F. Ross; Herbert Dubno

[57] ABSTRACT

A horizontally reciprocable plasticizing screw, whose turns define spaces of varying volume defining a low-pressure zone between two high-pressure zones, operates in an injection cylinder which is internally widened above the horizontal axial plane of the screw in an exhaust region coinciding with the low-pressure zone in the withdrawn position of the screw. The exhaust region, which is vented through an outlet at the top, is defined by a multiplicity of axially adjoining inwardly concave inserts received in a rectangular slot extending longitudinally in the upper cylinder wall, these inserts being removably secured to a supporting strip overlying the slot so as to be exchangeable for other inserts with cavities of different depths.

10 Claims, 2 Drawing Figures

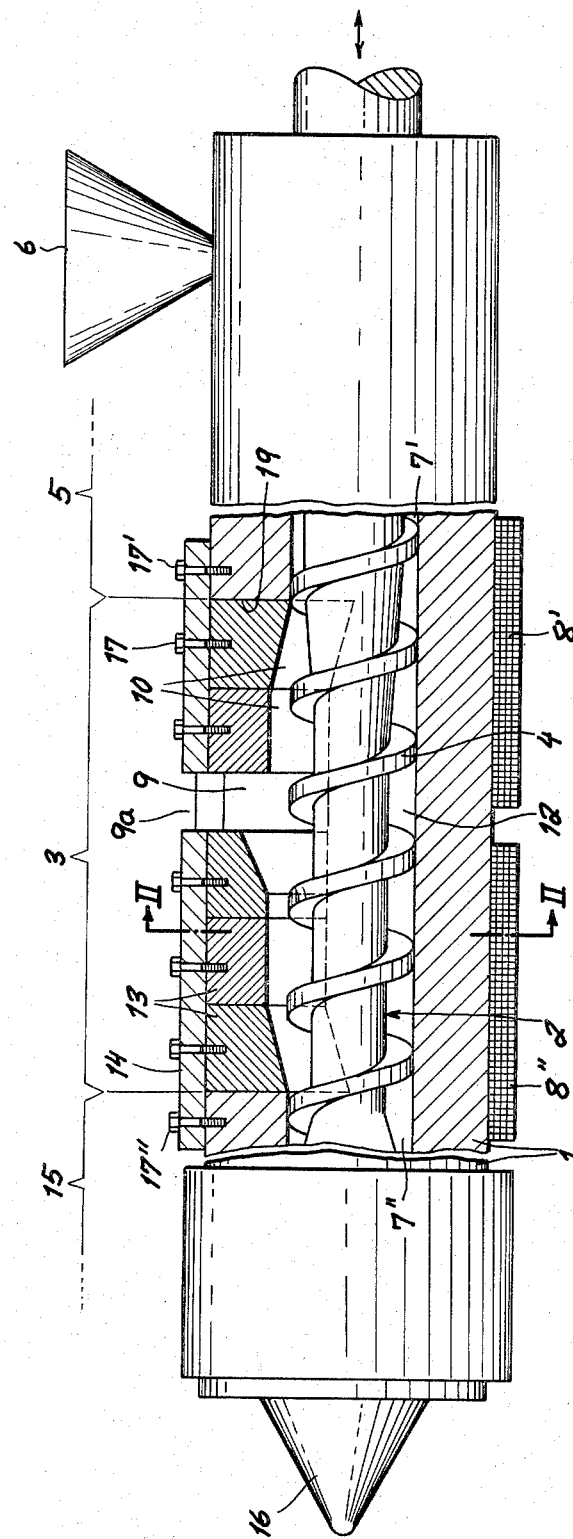
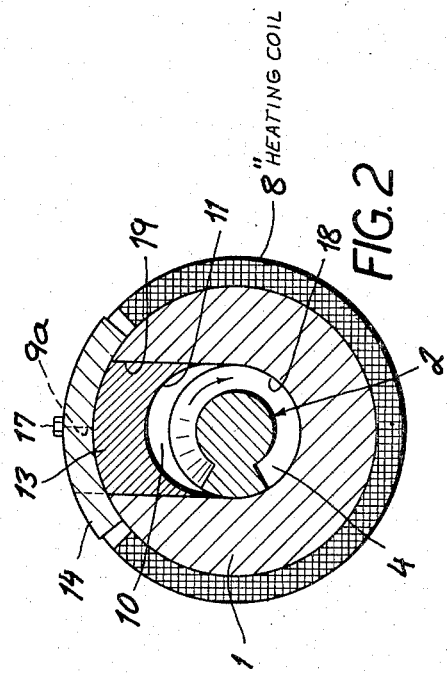

SCREW-TYPE INJECTOR FOR MOLDING MACHINE

My present invention relates to a screw-type injector for a molding machine, i.e. a unit wherein a plasticizing screw is rotatable and axially reciprocable in an injection cylinder to masticate and help liquefy an initially solid (usually granular) moldable material and to discharge this material in its plasticized state into a mold cavity through a nozzle at the front end of the cylinder.

Such plasticizing screws, rotating with the nozzle orifice closed during the plastification stage of a cycle, retreats during that phase against a hydraulic resistance or other loading force until sufficient material for filling the mold has been accumulated inside the cylinder; at this point the screw is advanced, usually hydraulically and with or without continuing rotation, to expel the plasticized mass through he nozzle whose orifice is opened during this injection stage.

Frequently, the plastic mass includes some constituents such as water, residual monomers or organic solvents which are volatile at the injection temperature and which should be removed ahead of the orifice. For this purpose it has already been proposed to make the screw profile nonuniform, i.e. to widen and/or deepen the mastication spaces or gaps between its threads over part of the length of the screw to provide an expansion zone. This zone should have a length equal to the reciprocation stroke of the screw so as to be in constant communication with an outlet for the volatile components provided in the cylinder wall.

The venting of the ejection cylinder by this type of construction is not always satisfactory and may lead to an unwanted leakage of some plastic material through the aforementioned outlet, particularly in the case of polymers of relatively low viscosity such as, for example, polyamides and polycarbonates. The liquefied mass, advancing under pressure of the rotating screw threads, encounters increased resistance at the junction of the expansion zone with a high-pressure zone in the forward part of the screw and, following the line of least resistance, is partly extruded through the outlet port whose inner end lies directly in the path of the threads.

The general object of our present invention, therefore, is to provide an improved injector of this type avoiding the aforestated drawback.

This object is realized, pursuant to our present invention, by designing the injection cylinder as a substantially horizontal housing whose cylindrical axial bore, accommodating a plasticizing screw with mastication spaces of varying volume, is widened above its horizontal midplane into an exhaust space which substantially registers with the aforedescribed expansion zone and communicates with its mastication space in an advanced screw position to facilitate the escape of the volatile components at a point ahead of the injection nozzle. The outlet for the evolving vapors opens into this exhaust space at a location remote from the screw threads so that the plasticized mass is not subjected to any pressure tending to force it through that outlet. On the contrary, any plastic material extruded into the space above will be restrained by its own weight from moving toward the outlet and will eventually rejoin the main stream of material advancing toward the nozzle.

Upon suitable relative positioning of this exhaust space on the cylinder housing and the expansion zone on the screw, and with their combined length exceeding the reciprocation stroke, the outlet will be in permanent communication with the expansion zone whose own length may therefore be appreciably less than in the conventional system described above. Advantageously, the outlet is disposed substantially midway along the axial length of the exhaust space whose depth progressively increases from the ends toward the outlet to create a chimney effect.

According to another advantageous feature of our invention, the exhaust space is formed by a removable plug inserted into a generally rectangular horizontal slot extending axially in an upper wall portion of the cylinder housing; through the use of several interchangeable plugs, the shape of the space can be varied to suit different operating conditions and/or materials. Preferably, the plug is axially subdivided into a plurality of juxtaposed inserts with concave undersides spaced differently from the cylinder axis so that modifications of the shape of the exhaust space may be realized by the replacement of only a few inserts rather than the entire plug. The inserts may be detachably secured to a common supporting member overlying the rectangular housing slot.

The invention will be described in greater detail hereinafter with reference to the accompanying drawing in which:

FIG. 1 is a side-elevational view, partly in section, of an injection unit embodying our present improvement; and FIG. 2 is a cross-sectional view taken on the line II — II of FIG. 1.

The drawing shows a cylinder housing 1, centered on a horizontal axis, and a plasticizing screw 2 rotatably and reciprocably lodged in a cylindrical central bore 18 of this housing. Screw 2 has threads 4 of constant pitch and a core of varying diameter defining gaps between successive turns, gaps 7', 7" being relatively shallow in a rear and a front high-compression zone 5, 15 whereas gaps 12 are relatively deep (e.g. twice as deep as the former) in an intermediate low-compression or expansion zone 3. Rear zone 5 extends past a hopper 6 for the introduction of granular molding material, e.g. a polyamide or a polycarbonate, into the cylinder bore between turns of the rotating screw; front zone 15 terminates ahead of a nozzle 16 whose alternately openable and closable orifice leads to a split mold, not shown, with one or more cavities to receive the liquefied plastic material. Zone 5 may extend over about half the length of the screw 2, each of the other two zones 3, 15 accounting for about one-fourth of that length.

In the illustrated forward position of the screw 2, whose stroke length may substantially equal or possibly exceed the length of zone 3, that zone registers with a longitudinally extending rectangular slot 19 in the upper wall of housing 1, this slot being overlain by a lid 14 having a series of axially adjoining inserts 13 removably secured thereto by means of screws; other screws 17' and 17" detachably hold the lid 14 onto adjoining housing portions in a fluid tight manner.

Inserts 13, which are of the same width and axial thickness, have concave undersides 11 defining crescent-shaped recesses 10 with the periphery of screw threads 4. The depth of these recesses is so chosen that an exhaust space defined thereby, which is substantially coextensive with the expansion zone 3 of screw 2 in the illustrated position, increases progressively in depth from the rear end of slot 19 toward approximately the middle of the slot and then grows progressively shallower toward its front end. At the point of greatest depth, two inserts are axially separated to provide a flue 9 terminating in an outlet port 9a offset from the vertex of the cylinder housing 1.

The sides of slot 19 are tangent to the cylinder bore 18 in the horizontal axial plane of that bore, as clearly seen in FIG. 2.

Flue 9 and port 9a are elevated above the threads 4 so that the liquefied mass in the exhaust space defined by the recesses 10 is not forced outwardly through that port but falls back into the gaps 12 under its own weight, thereafter continuing toward the nozzle 16.

Heating coils 8' and 8'' in the region of plug 13, 14 envelop the greater part of housing 1 to help maintain the necessary operating temperature in a region in which the reduced pressure and friction may not suffice to liquefy the plastic material.

Inserts 13 may be readily exchanged for similar inserts of different depth to modify the shape of the recesses 10.

During the plastification phase, water vapors and/or residual organic solvents and monomers accumulate in the exhaust space defined by the crescent-shaped recesses 10 and escape through the outlet port 9a. As the screw is gradually repressed toward the right (FIG. 1), its high-compression zone 15 maintains an effective barrier between this exhaust space and the injection chamber constituted by the forward end of bore 18 adjacent nozzle 16. Thus, the plastic material supplied under pressure to that chamber remains trapped until the nozzle orifice is opened upon the beginning of the injection stroke of the screw 2; it will be apparent that, if desired, this injection stroke could carry the expansion zone 3 beyond the position illustrated in FIG. 1 as long as some part of that zone remains in communication with the exhaust space and its outlet.

We claim:

1. An injection unit for a molding machine, comprising:
 a substantially horizontal housing with a cylindrical axial bore provided at one end with hopper means for the introduction of a moldable plastic material, said housing terminating at its other end in an injection nozzle for the discharge of said material into a mold, said housing having an upper wall portion formed with a generally rectangular slot extending axially above said bore;
 a reciprocable screw coaxially disposed in said bore, said screw having thread means with turns forming mastication spaces for said material, the volume of said mastication spaces being relatively small in a pair of compression zones proximal to said hopper means and said nozzle, respectively, and being relatively large in an intervening expansion zone; and
 a removable plug occupying part of said slot and defining above the horizontal midplane of said bore an exhaust space substantially registering with said expansion zone and communicating with the mastication spaces thereof in an advanced position of said screw approaching said nozzle, said plug comprising a plurality of axially adjoining inserts with concave undersides raised above the cylindrical periphery of said bore, said housing having an outlet for volatile components opening into said exhaust space at a location remote from said screw means.

2. An injection unit for a molding machine, comprising:
 a substantially horizontal housing with a cylindrical axial bore provided at one end with hopper means for the introduction of a moldable plastic material, said housing terminating at its other end in an injection nozzle for the discharge of said material into a mold; and
 a reciprocable screw coaxially disposed in said bore, said screw having thread means with turns forming mastication spaces for said material, the volume of said mastication spaces being relatively small in a pair of compression zones proximal to said hopper means and said nozzle, respectively, and being relatively large in an intervening expansion zone;
 said bore being widened only above its horizontal midplane into an exhaust space substantially registering with said expansion zone and communicating with the mastication spaces thereof in an advanced position of said screw approaching said nozzle, said housing having an outlet for volatile components disposed substantially midway along the axial length of said exhaust space and opening into said exhaust space at a location remote from said screw means, said exhaust space progressively increasing in depth from its ends to the location of said outlet and from the vicinity of said midplane to the top of said bore.

3. An injection unit as defined in claim 2 wherein said housing has an upper wall portion formed with a generally rectangular horizontal slot extending in axial direction, further comprising a removable plug for said slot defining said exhaust space.

4. An injection unit for a molding machine, comprising:
 a substantially horizontal housing with a cylindrical axial bore provided at one end with hopper means for the introduction of a moldable plastic material, said housing terminating at its other end in an injection nozzle for the discharge of said material into a mold, said housing having an upper wall portion formed with a generally rectangular slot extending axially above said bore;
 a reciprocable screw coaxially disposed in said bore, said screw having thread means with turns forming mastication spaces for said material, the volume of said mastication spaces being relatively small in a pair of compression zones proximal to said hopper means and said nozzle, respectively, and being relatively large in an intervening expansion zone; and
 a removable plug occupying part of said slot and defining above the horizontal midplane of said bore an exhaust space substantially registering with said expansion zone and communicating with the mastication spaces thereof in an advanced position of said screw approaching said nozzle, said housing having an outlet for volatile components disposed substantially midway along the axial length of said exhaust space and opening into said exhaust space at a location remote from said screw means, said exhaust space progressively increasing in depth from its ends to the location of said outlet.

5. An injection unit as defined in claim 4 wherein said plug comprises a plurality of axially adjoining inserts with concave undersides raised above the cylindrical periphery of said bore.

6. An injection unit as defined in claim 1 wherein the undersides of said inserts define crescent-shaped recesses with the concave undersides of said inserts, the depth of said recesses differing for different inserts.

7. An injection unit as defined in claim 1 wherein said plug further includes a supporting member overlying said slot, said inserts being detachably mounted on said supporting member.

8. An injection unit as defined in claim 7 wherein said inserts have the same width and thickness.

9. An injection unit as defined in claim 4 wherein the sides of said plug are tangent to the cylindrical periphery of said bore at said horizontal midplane.

10. An injection unit as defined in claim 2 wherein said housing is provided with heating means in the region of said exhaust space.

* * * * *